June 5, 1934.  R. RAFFO ET AL  1,961,570
MECHANICAL DEVICE FOR THE PASSING AND REPRODUCING OF TALKING FILMS
Filed Aug. 6, 1931  4 Sheets-Sheet 1
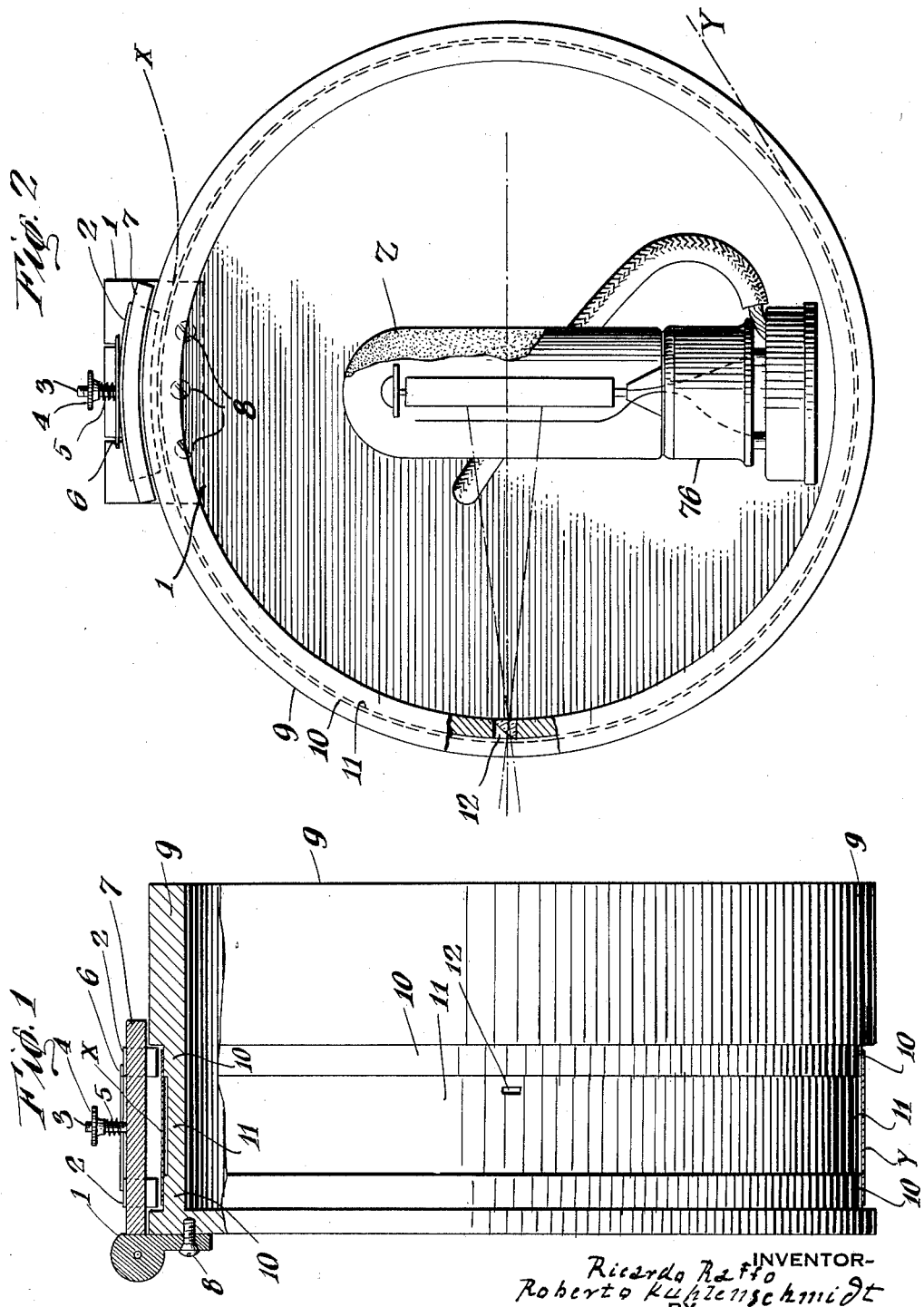

June 5, 1934.  R. RAFFO ET AL  1,961,570
MECHANICAL DEVICE FOR THE PASSING AND REPRODUCING OF TALKING FILMS
Filed Aug. 6, 1931   4 Sheets-Sheet 2
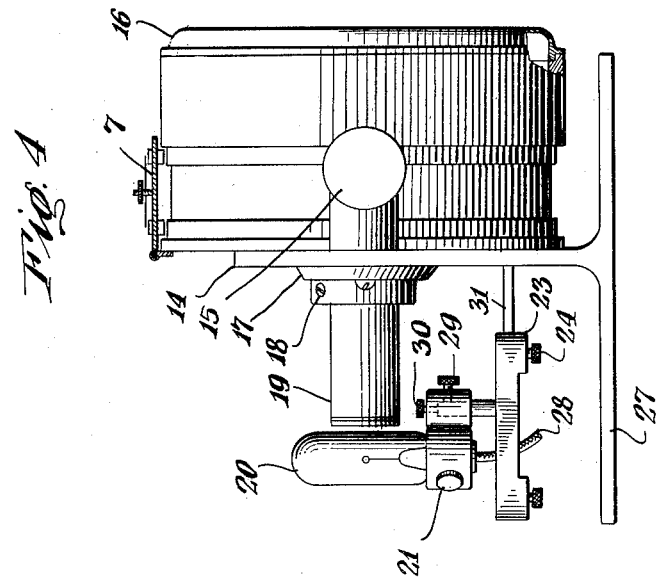
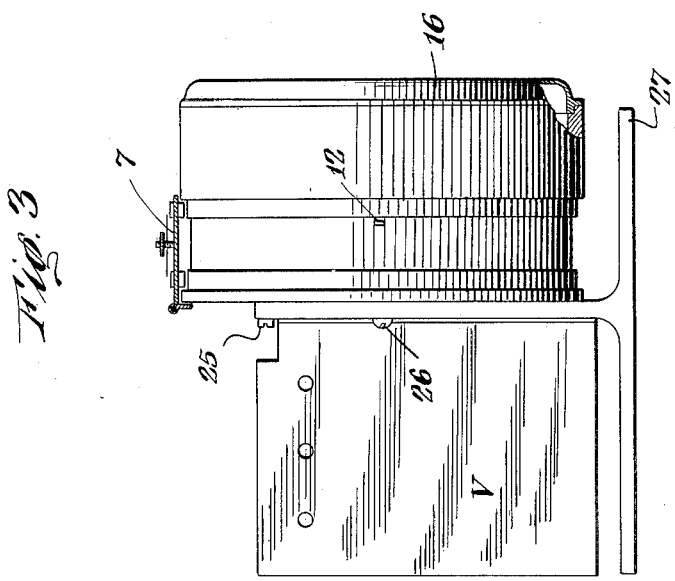
INVENTORS:
Ricardo Raffo
Roberto Kuhlenschmidt
BY
ATTORNEY- June 5, 1934.  R. RAFFO ET AL  1,961,570
MECHANICAL DEVICE FOR THE PASSING AND REPRODUCING OF TALKING FILMS
Filed Aug. 6, 1931  4 Sheets-Sheet 3
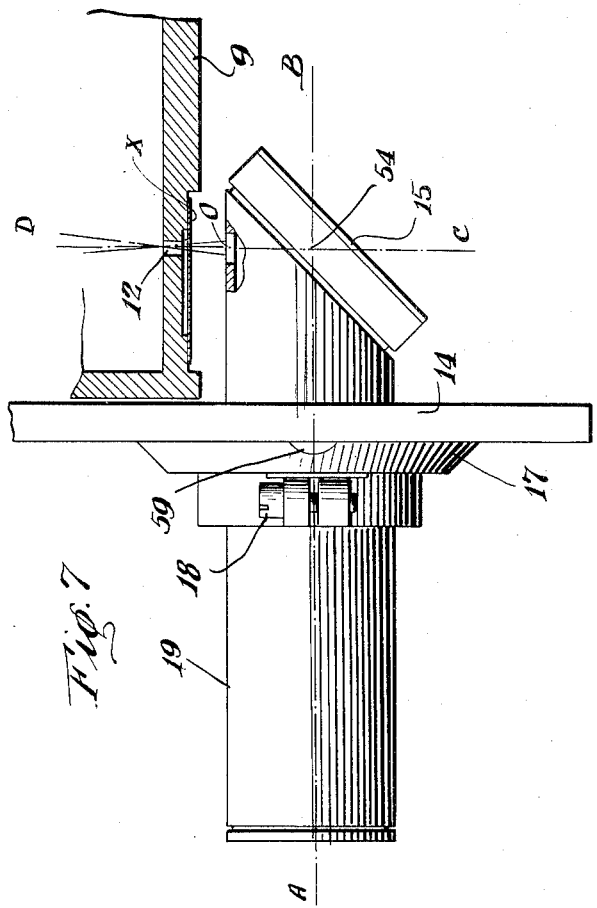
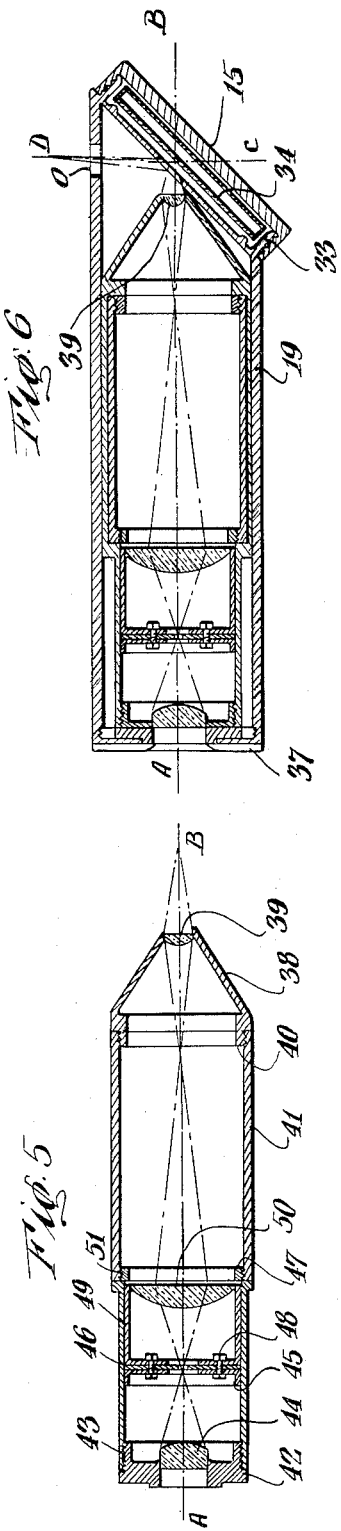

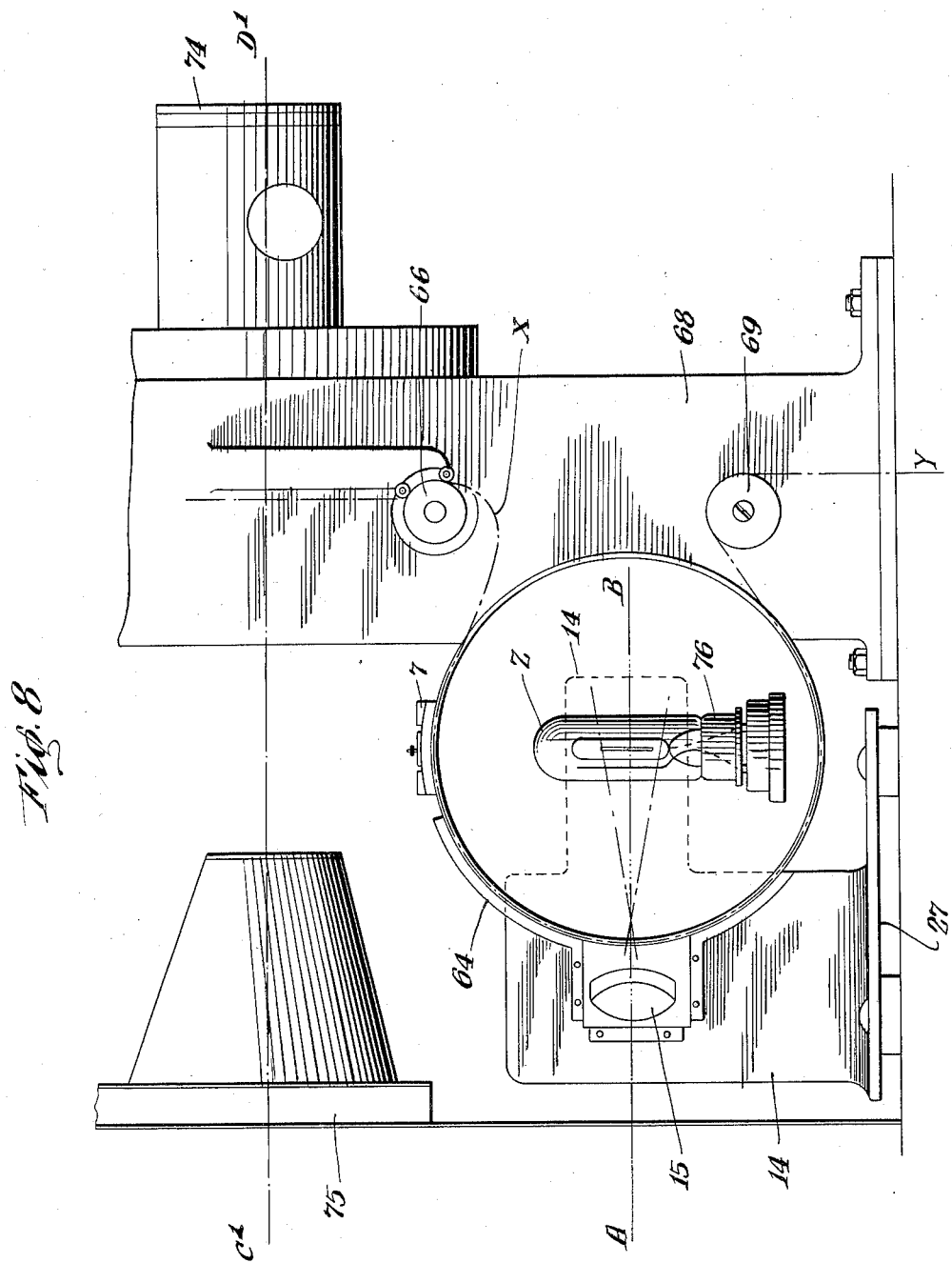

Patented June 5, 1934

1,961,570

UNITED STATES PATENT OFFICE 1,961,570

MECHANICAL DEVICE FOR THE PASSING AND REPRODUCING OF TALKING FILMS

Ricardo Raffo and Roberto Kuhlenschmidt, Buenos Aires, Argentina

Application August 6, 1931, Serial No. 555,410
In Argentina June 5, 1931

1 Claim. (Cl. 179—100.3)

This invention refers to certain improvements in mechanical devices used for passing and reproducing talking films which have the sound engraved on same either by means of the variable density or variable area systems and with which improvements it is possible to obtain an apparatus completely reformed and adaptable to being attached to any ordinary moving picture machine, even to those used by amateurs, without requiring the modification of the projector, as it is so calculated that the film is placed at its exact point of synchronism, thus avoiding the formation of abnormal curlings. Furthermore it has been possible to eliminate from this invention the use of toothed rollers, compensating rollers and all lateral compression of the film, thus avoiding deterioration and breaking of the films.

It is a well known fact that the optical system which illuminates the photographic sound in the apparatus designed for same, obliges the fitting of the silent system to the talking system, as the length of the said optical system of sound, makes it necessary to effect considerable modifications which are equivalent to the construction of a new apparatus.

In the present improvements the optical system that illuminates the sound photograph, is characterized by the fact that it is placed sideways, changing the direction of the luminous rays by means of a prism or mirror, this allowing the length of the said system to be reduced by approximately 6 inches and it is therefore possible to accommodate it to the space existing between the lantern and the projecting device of any ordinary moving picture apparatus, without it being necessary to carry out any modifications. Finally the reduction obtained by these improvements and the simplicity of same greatly reduces the cost.

Reference is made to the accompanying drawings wherein:

Fig. 1 is a front view of the cylinder or case containing the photo-electric cell;

Fig. 2 is a side view of same;

Fig. 3 is a rear view of the cylinder or chamber placed on its support and covered;

Fig. 4 is a similar view to Fig. 3 but without the cover, showing the exciter lamp and the objective in position;

Fig. 5 is a longitudinal sectional view of the objective system and tube and its cover;

Fig. 6 is a transverse and longitudinal view of the objective and optical system, showing the prism or mirror placed at an angle of 135°;

Fig. 7 is a detailed view of Fig. 4 showing the optical system viewed from above;

Fig. 8 is a schematic view showing the location of the improved apparatus between a moving picture projector and its lantern.

These improvements consist of a metallic cylinder or chamber (9), Figs. 1 and 2, on which a groove is made in order to form the guides (10) over which the film moves; another deeper groove is made 1 millimeter lower down in order to avoid friction of the film. On this surface is located the aperture (12) through which the luminous rays are projected by the objective which will be described below, these luminous rays are refracted on the photoelectric cell (Z) which is shown in Fig. 2 and which may be of any ordinary type.

On the upper portion of the cylinder or chamber (9) there is located a support (1) of the plate (7) fixed on the cylinder (9) by means of the screws (8). The movable guides (2) press the film (X—Y) onto the fixed guides (10) located on the upper portion of the cylinder (9) by means of the pressure afforded by the disc (6) which receives pressure from the spring (5) fixed on the screw (3) and held in position by the nut (4) Figs. 1 and 2.

The letters (X) and (Y) of Figs. 1 and 2 represent the film as it enters and leaves the cylinder (9), whilst (A) and (B) represent a cross section of the said cylinder.

The cylinder (9) is placed on a suitable support (27) and fixed in position by means of the screws (26) Figs. 3 and 4 and is covered by means of the cover (16). The exciter lamp (20) is covered by the casing (V) Fig. 3.

When the casing (V) is taken off, the location of the exciter lamp (20) which may be of any suitable type, may be seen as in Fig. 4 which also shows the position of the objective. This objective is comprised by the tube (41) Fig. 5 on which is screwed a cover (42) and supports the condenser lens (44) which is maintained in position by the washer (43).

A plate (46) which forms the slit of the system located in the path of the condenser lens (44) is maintained in position by the cylinders (45) and (49) held in place by the screws (48).

The washer (51) supports the lens (50).

The tube (41) carries on its opposite end a cone (38) held in position by the threaded portion (40) which permits the focussing of the objective (39) so as to project the rays through the slit in plate (44) onto mirror (34).

To complete and characterize that which has been described it will be found that on the forward portion of the outer tube (19) that covers the tube (41) is located a mirror (34), the inclination of which, in relation to the axis of the objective A—B, Fig. 6 forms an angle of 135°. The mirror is placed in order that it deviates the luminous ray from the line A—B to the line C—D passing through the aperture (O) located in the outer tube (19).

This mirror (34) is located in a case consisting of the threaded ring (33) and its cover (35) which covers the mirror (34).

In place of the mirror described, a prism may be used in order to deviate at a right angle the direction of the luminous rays projected by the objective.

Fig. 7 is a detailed plan view of the improved optical system showing the film (X) passing over the fixed guides (10) of the cylinder (9) and receiving from the mirror or prism (34) the rays C—D which pass through the aperture (12).

The cylinder (9) is placed between the projector of an ordinary cinema apparatus (68) and its lantern (75), Fig. 8, in such a manner that when the film (X) leaves the projector passing over the "Maltese cross" drum (66) it encounters the plate (7) of the cylinder (9), this being made possible by the reduction of the size of the "talking" portion by deviating the optical system reproducer of sound some 90°.

In operation the apparatus is placed between the projector of an ordinary moving picture apparatus (68) and its lantern (75) the film (X) leaves the projector passing over the "Maltese cross" drum (66) and enters by the plate (7) of the cylinder (9) into the sound area pulled by the toothed roller 69 of the projector at the rate of 180 to 360 R. P. M.

The film is held in position by the fixed guides (10), Figs. 1 and 2 and moves forward pressed against the cylinder (9) by means of the constant pressure afforded by the movable guides (2) Figs. 1 and 2 and the continuous pull of the toothed roller (67) Fig. 8. Lateral compression for maintaining the film in position is avoided, since it is possible to allow a certain amount of toleration in lateral displacement, owing to the fact that the aperture through which is passed the light from the optical system (12) is slightly narrower than the sound photograph of any film, thus eliminating the danger of any other but the sound portion of the film passing over the aperture.

The axis of the luminous ray from the exciter lamp (20) is directed by the objective illustrated in Fig. 5, and strikes the mirror (34) being then deviated 90°, passing through the aperture (12) to the photoelectric cell (Z) and from here to the corresponding amplifiers.

Having thus described our invention what we claim and desire to protect by Letters Patent is:

In a sound unit for sound on film reproducing apparatus, a grooved cylinder for guiding the film and laterally disposed to said apparatus, said cylinder having an aperture for the passage of the light rays, of a photoelectric cell within said cylinder, a film guide plate secured to said cylinder by a bracket, movable guides pressing the film into the groove in said cylinder, a spring pressed disc controlling said guides, and means to regulate the pressure.

RICARDO RAFFO.
ROBERTO KUHLENSCHMIDT.